United States Patent [19]

Hermann

[11] 3,923,713

[45] Dec. 2, 1975

[54] NON-YELLOWING TEXTILE ADHESIVE

[75] Inventor: David Trimble Hermann, Montgomery Township, N.J.

[73] Assignee: American Cyanamid Company, Stamford, Conn.

[22] Filed: Mar. 8, 1974

[21] Appl. No.: 449,314

Related U.S. Application Data

[63] Continuation-in-part of Ser. No. 275,393, July 26, 1972, abandoned.

[52] U.S. Cl..... 260/29.2 TN; 260/13; 260/29.6 NR; 260/77.5 AM; 260/77.5 A
[51] Int. Cl.² .................. C08G 18/12; C08G 18/71
[58] Field of Search............................. 260/29.2 TN

[56] References Cited
UNITED STATES PATENTS

| | | | |
|---|---|---|---|
| 2,921,866 | 1/1960 | Wilson | 260/77.5 |
| 2,968,575 | 1/1961 | Mallonee | 260/29.2 TN |
| 3,084,092 | 4/1963 | Arlt | 260/29.2 TN |
| 3,499,824 | 3/1970 | Strazdins et al. | 260/29.2 TN |
| 3,551,288 | 12/1970 | Ziemann et al. | 260/29.2 TN |
| 3,640,924 | 2/1972 | Hermann et al. | 260/29.2 TN |

*Primary Examiner*—Murray Tillman
*Assistant Examiner*—Arthur H. Koeckert
*Attorney, Agent, or Firm*—H. G. Jackson

[57] ABSTRACT

Yellowing of textile adhesives, which are aqueous dispersions of a particular class of isocyanate-terminated polyurethane prepolymers having pendant carboxyl groups added to water containing a tertiary aliphatic amine, can be substantially reduced by adding a relatively small quantity of a suitable organic monoisocyanate to the adhesive composition along with a commercial antioxidant and UV absorber.

6 Claims, No Drawings

NON-YELLOWING TEXTILE ADHESIVE

This is a continuation-in-part of my co-pending application Ser. No. 275,393, filed July 26, 1972 and now abandoned.

BACKGROUND OF THE INVENTION

1. Field of the Invention

The invention pertains to non-yellowing textile adhesive of urethane polymers.

2. Description of the Prior Art

The polyurethane adhesive compositions of U.S. Pat. No. 3,640,924 (1972) are subject to yellowing when exposed to the atmosphere. The yellowing is believed to be due primarily to the oxides of nitrogen in the air. The responsibility of atmospheric oxides of nitrogen for the color change of fabrics dyed with certain dyes was recognized many years ago. The phenomenon is called "gas fading".

Some relief from the yellowing due to gas fading can be obtained by incorporating commercial ultraviolet absorbers and antioxidants in the adhesive composition. These materials have been used before in a variety of substrates, including polyurethane polymers, for the purpose of reducing yellowing caused by the atmosphere.

I have discovered that the yellowing can be substantially reduced by adding a relatively small quantity of a suitable organic monoisocyanate to the adhesive composition along with a commercial antioxidant and UV absorber.

SUMMARY OF THE INVENTION

The invention is a process for preparing a non-yellowing polyurethane composition in the form of an aqueous dispersion which comprises forming an isocyanate-terminated prepolymer by reacting tolylene diisocyanate with a mixture of two glycols at a ratio of from 1.6 to 3.0 moles of diisocyanate per mole of total glycol, one of the glycols being a nonpolymeric glycol of the formula:

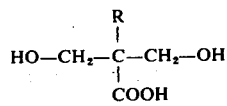

wherein R is hydrogen or lower alkyl, the other glycol being a polyalkylene ether glycol of the formula:

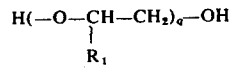

wherein $R_1$ is lower alkyl and $q$ is an integer sufficiently large to provide an average molecular weight of from 750 to 5,000, the molar ratio of glycols being 0.25:1 to 2:1, respectively; forming a latex by reacting the isocyanate-terminated prepolymer in aqueous medium containing a tertiary lower alkyl amine ($C_1$–$C_3$) and allowing chain extension with water to proceed until substantially all of the isocyanate groups have been reacted; adding an organic monoisocyanate in an effective amount to prevent yellowing to the latex; and adding a thickening agent to the monoisocyanate-treated latex to produce an adhesive of viscosity in the range of from 200 to 150,000 cps. The invention includes the compositions obtained from the above-described process and the process for using the adhesive compositions in textile application.

DESCRIPTION OF THE PREFERRED EMBODIMENTS

Yellowing in aqueous textile adhesive compositions containing dispersed polyurethane polymers can be substantially reduced by adding a relatively small quantity of a suitable organic monoisocyanate to the adhesive composition. In theory, the monoisocyanate reacts with terminal primary amino groups formed during chain extension with water. An isocyanate group reacts with water to form a primary amine, and if further reaction with an isocyanate group does not take place, the amine group remains.

Suitable organic monoisocyanates include long chain alkyl isocyanates and phenyl isocyanates. These isocyanates are known to be rapid reactors with primary amino groups. The long chain isocyanates should have from 10 to 22 carbon atoms in the alkyl chain, and they include, among others, decyl isocyanate, dodecyl isocyanate, hexadecyl isocyanate and octadecyl isocyanate. The phenyl isocyanates include phenyl isocyanate and lower alkyl substituted phenyl isocyanate, such as tolyl isocyanate.

The monoisocyanates are added to the adhesive composition at the completion of the chain extension step. The amount of monoisocyanate used to effect non-yellowing should be between 0.1 and 2.0%, preferably between 0.3 and 1.5%, based on urethane solids. After the addition of the monoisocyanate, the dispersion is stirred to allow completion of the reaction with the monoisocyanate.

Proper viscosity of adhesive is important to prevent undue penetration of the adhesive into the substrate to which it is being applied. In other words, the bulk of this adhesive should remain on the surface of the substrate to provide good adhesion. Viscosities in the order of 200 to 150,000 cps., are normally satisfactory. Suitable thickening agents are used to obtain the desired viscosity; and they include those well-known in the art such as methyl cellulose, hydroxyethyl cellulose, polyacrylic emulsion plus alkali, gums, etc.

The adhesive of the invention can be used with any of the fabrics and plastic sheeting or foams normally used in the laminating processes, these include woven knit and non-woven fabrics of natural and synthetic fibers, and a variety of plastic sheeting and foams, but particularly those made of poly(vinyl chloride) or polyurethane. In the flocking processes, the adhesive can be used with any of the substrates normally used in the flocking process, including woven and non-woven fabrics of natural and synthetic fibers, paper, plastic coated fabrics, plastic films and sheets, wood, metal, rubber, glass, etc. Any of the flocking materials may be used. These include synthetic and natural fibers.

The methods for applying the adhesive to the substrate are conventional and any of the well-known procedures may be used. The assembling of the laminate or flocked fabric is also by conventional procedures. Such methods are well-known in the art.

After the assembly step, it is necessary to dry and cure the adhesive. Drying and curing temperatures between 250° and 325°F., preferably between 270° and 300°F., are suitable.

The bonding obtained by the adhesive composition of this invention is very durable. It has shown exceptional strength under wet conditions, as during and after laundering.

Other agents may be added to the adhesive composition. For some uses it may be desirable to add a thermosetting aminoplast precondensate, such as melamine-formaldehyde and urea or urea-formaldehyde condensate, to improve the solvent resistance of the adhesive. The preferred amino precondensates are melamine-formaldehyde condensates, including alkyl ethers thereof.

The following examples are set forth to illustrate the invention and are not intended to be limitative.

EXAMPLE 1

A. A prepolymer was prepared by reacting together 8,525 parts of polypropylene glycol (MW-2000), 418 parts of 2,2-bis(hydroxymethyl)propionic acid, and 2,864 parts of tolylene diisocyanate (80/20 mixture of 2,4- and 2,6-isomers). The mixture was stirred at 70°C. for 20 hours. The free NCO content of the prepolymer was 5.0%.

To 100 parts of the prepolymer there was added 0.5 part of a commercial ultraviolet absorber, 5-chloro-2-(3',5'-di-tert.butyl-2'-hydroxyphenyl)benzotriazole, and 0.5 part of a commercial antioxidant, 2,2'-methylenebis(4-6-tert.butyl phenol). The mixture was then added to a vigorously stirred solution of 3.3 parts of triethylamine in 186 parts of water. The resulting dispersion, containing 35% solids, was stirred for 5 hours. To 100 parts of the dispersion there was added 0.2 part of phenylisocyanate, and the dispersion was stirred for 1 hour. The dispersion was then thickened by the addition of a commercial thickening agent of the polyacrylic acid type, Acrysol ASE-60 (Rohm & Haas).

B. A second dispersion was prepared by the procedure of A, with the exception that phenyl isocyanate was omitted.

Polymer films were prepared by casting the dispersions A and B on glass plates. The relative yellowing of the films was determined by AATCC Test Method 23-1971. In this test the films were exposed to an atmosphere of oxides of nitrogen. After three cycles of exposure of 16 hours each, the discoloration of each sample, as compared with a standard of whiteness, was measured on a Hunter Color Difference Meter. A yellowness index was thus obtained as a measure of the discoloration. The higher yellowness index values indicate more yellowing than the lower yellowness index values. The results are shown in Table I.

TABLE I

| Film | Yellowness Index |
| --- | --- |
| A | 6.3 |
| B | 38.2 |

EXAMPLE 2

A. To 100 parts of the dispersion of Example 1, instead of phenyl isocyanate, there was added 0.5 part of octadecyl isocyanate. The dispersion was thickened as in Example 1.

B. A second dispersion was prepared by the procedure of A, with the exception that no octadecyl isocyanate was used.

Polymer films were exposed to oxides of nitrogen for two cycles of 16 hours each. The yellowness indices were measured by the procedure of Example 1. The results are shown in Table II.

TABLE II

| Film | Yellowness Index |
| --- | --- |
| A | 5.7 |
| B | 39.7 |

Five dispersions were prepared by the following procedure:

A prepolymer was prepared by reacting together 3,550 parts of polypropylene glycol (MW-1025), 27.3 parts of 2,2-bis(hydroxymethyl)propionic acid, and 1,650 parts of tolylene diisocyanate (80/20 mixture of 2,4- and 2,6-isomers). The reaction mixture was stirred at 60°C. until the free NCO content was about 7.2%.

To 100 parts of the prepolymer there was added the amount of commercial ultraviolet absorber, 5-chloro-2-(3',5'-di-tert.butyl-2'-hydroxyphenyl)benzotriazole, and commercial antioxidant, 2,2'-methylenebis(4-methyl-6-tert.butylphenol), shown in Table III. The mixture was added to a vigorously stirred solution of 3.3 parts of triethylamine in 186 parts of water. The resulting dispersion containing 35% solids was stirred for 5 hours.

To 100 parts of the dispersion there was added the amount of monoisocyanate shown in Table III. The thickened dispersions were cast on glass, and the yellowness indices, after exposure to oxides of nitrogen, were determined.

TABLE III

| Film | UV Absorber | Antioxidant | Monoisocyanate | Yellowness Index |
| --- | --- | --- | --- | --- |
| A | 0.5% | 0.5% | 0.15% (1) | 2.4 |
| B | 0.5% | 0.5% | 0.15% (2) | 5.3 |
| C | none | none | 0.15% (1) | 18.6 |
| D | 0.5% | 0.5% | none | 23.7 |
| E | none | none | none | 36.2 |

(1) Phenyl isocyanate
(2) Dodecyl isocyanate

I Claim:

1. In a process for preparing a polyurethane adhesive composition in the form of an aqueous dispersion comprising the steps of: forming an isocyanate-terminated prepolymer by reacting tolylene diisocyanate with a mixture of two glycols at a ratio of from 1.6 to 3.0 moles of diisocyanate per mole of total glycol, one of said glycols being a non-polymeric glycol of the formula:

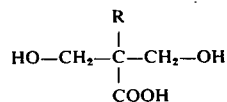

wherein R is hydrogen or lower alkyl, the other of said glycols being a polyalkylene ether glycol of the formula:

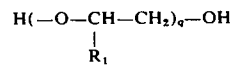

wherein $R_1$ is lower alkyl and $q$ is an integer sufficiently large to provide an average molecular weight of from 750 to 5000, the molar ratio of glycols being 0.25:1 to 2:1 respectively; forming a latex by reacting the isocyanate-terminated prepolymer in aqueous medium containing a tertiary lower alkylamine ($C_1$–$C_3$) and allowing chain extension with water to proceed until substantially all of the isocyanate groups have been reacted; and adding a thickening agent to said latex to produce an adhesive of viscosity in the range of from 200 to 150,000 cps, the improvement which comprises:

adding an organic monoisocyanate of an alkyl isocyanate having 10 to 22 carbon atoms in the alkyl chain or a phenyl isocyanate to the latex in an amount effective of prevent yellowing.

2. A process according to claim 1 wherein the monisocyanate is an alkyl isocyanate having 10 to 20 carbon atoms in the alkyl chain.

3. A process according to claim 2 wherein the monoisocyanate is dodecyl isocyanate.

4. A process according to claim 1 wherein the monoisocyanate is phenyl isocyanate.

5. An adhesive composition prepared according to the process of claim 1.

6. A process according to claim 1 wherein the monisocyanate is added to the unthickened latex.

* * * * *